3,278,645
**COMPOSITION COMPRISING A BLEND OF CHLO-
RINATED POLYETHYLENE AND ETHYLENE-
VINYL ACETATE COPOLYMER**
Carlo Paoloni, Milan, Italy, assignor to Società Elettrica
ed Elettrochimica del Caffaro S.p.A., Milan, Italy, a
company of Italy
No Drawing. Filed Oct. 18, 1962, Ser. No. 231,571
Claims priority, application Italy, Apr. 4, 1962,
Patent 664,940
8 Claims. (Cl. 260—897)

It is well known that the chlorinated polyethylene polymers, i.e. those obtained by chlorination of polyethylene, preferably of the high pressure type, constitute resinous substances which are generally soluble in aromatic solvents and which leave transparent films after the solvent has evaporated. It has been observed that by incorporating pigments into these films, the latter become opaque and lose some of their adhesive nature, which renders difficult and limits the possibility of the use thereof. The possibility of using chlorinated ethylene polymers are also limited in the plastic compositions because of the fragile nature of the resins formed by these polymers. The addition of plasticisers known per se does not produce any substantial improvements in these compositions.

The applicants have now found a process for the preparation of new compositions, which have the required characteristics for being adapted particularly to a use in the industries concerned with varnishes and plastic substances for use therein.

The applicants have in fact found that by causing a mixture of chlorinated polyethylene with substances based on ethylene-vinyl copolymers to pass through a two-cylinder calender heated to about 100° C., until there is repeated formation of a sheet of homogeneous plastic material, there is obtained a mixture of plastic materials especially suitable as film-forming components in varnishes and lacquers.

The above operation is even more effective if the chlorinated polyethylene has added thereto a pigment, inasmuch as the pigment particles facilitate the amalgamation of the chlorinated polymers with those which are not chlorinated, and thus there are formed plastic compositions having high mechanical resistance, presenting brilliant surfaces and also having the property of being soluble in solvents, whereby excellent varnishes for anti-corrosive coatings are formed.

The ratio between the chlorinated ethylene polymer and the ethylene-vinyl copolymer can vary within fairly wide limits, as can also the additions of appropriate adjuvants such as plasticisers, stabilisers, additives and pigments designed to impart good resistance and adhesive characteristics to the mixtures.

The chlorinated polyethylene polymer results from the appropriate chlorination of polyethylene and its degree of chlorination can vary within wide limits, it generally being preferred to have chlorine contents of 60 to 67%.

The ethylene-vinyl copolymers are those formed by the copolymers of high molecular weight from ethylene compounds and vinyl compounds, with a variable ratio between the ethylene fraction and vinyl fraction. Ethylene-vinyl acetate copolymers are particularly suitable for the purposes of the present invention. The pigments which are chosen can either be mineral pigments or organic pigments.

The compounds forming the subject of the present invention are adapted to the preparation of lacquers and varnishs, inks and like compositions.

*Example 1*

20 parts of ethylene-vinyl acetate copolymers are added to 80 parts of chlorinated polyethylene with a chlorine content of 65%. The mixture is repeatedly passed through a two-cylinder calender, heated to 100° C., until a homogeneous plastic sheet is obtained. After cooling, the mixture is elastic and is adapted to be used in the preparation of anti-corrosive lacquers and varnishes.

*Example 2*

11.2 parts of ethylene-vinyl acetate copolymer, 50 parts of titanium dioxide (rutile) and 1.8 parts of basic lead phosphite are added to 37 parts of chlorinated polyethylene with a chlorine content of 64%. The mixture is repeatedly passed through a two-cylinder calender, heated to 100° C., until a homogeneous sheet is obtained. After cooling, the mixture is ground and serves for the preparation of lacquers with solvents.

I claim:
1. A synthetic resin composition especially adapted for use in lacquers, varnishes and inks, comprising an intimate mixture of (1) a copolymer of ethylene and vinyl acetate and (2) a chlorinated polyethylene having a chlorine content of at least 60%, the ratio of said copolymer to said chlorinated polyethylene being within the weight ratio range of 1:3 to 1:4.
2. A synthetic resin composition as claimed in claim 1 wherein there is included a pigment material.
3. A synthetic resin composition as claimed in claim 1 wherein there is included a plasticizer.
4. A synthetic resin composition as claimed in claim 2 wherein there is included a plasticizer.
5. A synthetic resin composition as claimed in claim 1 wherein there is included a stabilizer.
6. A synthetic resin composition as claimed in claim 2 wherein there is included a stabilizer.
7. A synthetic resin composition as claimed in claim 1 wherein the chlorinated polyethylene contains from about 60 to about 67% chlorine.
8. A synthetic resin composition as claimed in claim 2 wherein the chlorinated polyethylene contains from about 60 to about 67% chlorine.

References Cited by the Examiner
UNITED STATES PATENTS

| | | | |
|---|---|---|---|
| 2,516,591 | 7/1950 | Remington | 260—897 |
| 2,628,214 | 2/1953 | Pinkney et al. | 260—897 |

FOREIGN PATENTS

| | | |
|---|---|---|
| 709,963 | 6/1954 | Great Britain. |
| 828,938 | 2/1960 | Great Britain. |

MURRAY TILLMAN, *Primary Examiner.*
LEON J. BERCOVITZ, *Examiner.*
J. A. KOLASCH, E. B. WOODRUFF,
*Assistant Examiners.*